United States Patent
Huang et al.

(10) Patent No.: US 7,245,714 B2
(45) Date of Patent: *Jul. 17, 2007

(54) COMPUTER TELEPHONY INTEGRATION HOTELLING METHOD AND SYSTEM

(75) Inventors: Kuang-Yang Huang, Fremont, CA (US); Matthew S. Malden, San Francisco, CA (US); Henry D. Jay, Foster City, CA (US); Anil Annadata, Milpitas, CA (US)

(73) Assignee: Siebel Systems, Inc., San Mateo, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 11/114,461

(22) Filed: Apr. 26, 2005

(65) Prior Publication Data

US 2005/0195963 A1    Sep. 8, 2005

Related U.S. Application Data

(60) Division of application No. 10/439,441, filed on May 16, 2003, now Pat. No. 6,973,175, which is a continuation of application No. 09/541,379, filed on Mar. 31, 2000, now Pat. No. 6,577,726.

(51) Int. Cl.
*H04M 3/00* (2006.01)
*H04M 5/00* (2006.01)

(52) U.S. Cl. .............................. 379/265.02; 379/265.04

(58) Field of Classification Search ..............................
379/265.01–266.1, 309
See application file for complete search history.

(56) References Cited

U.S. PATENT DOCUMENTS

| | | | |
|---|---|---|---|
| 6,339,593 B1 * | 1/2002 | Kikinis ....................... 370/352 |
| 6,636,587 B1 * | 10/2003 | Nagai et al. ............. 379/88.14 |
| 6,785,379 B1 * | 8/2004 | Rogers et al. ......... 379/265.02 |
| 2001/0036171 A1 * | 11/2001 | Tonnby et al. .............. 370/352 |

* cited by examiner

*Primary Examiner*—Benny Q Tieu
(74) *Attorney, Agent, or Firm*—Campbell Stephenson LLP

(57) ABSTRACT

A method and system to dynamically associate a workstation with a teleset. Data related to the call are transferred to the workstation during the call. Forming the dynamic association between the workstation and the teleset can include determining a hostname for the workstation, searching for the hostname in configuration data, and, if the hostname is found, dynamically associating the workstation with a teleset associated with the hostname. A server can be notified to transfer data associated with a call on the teleset to the workstation.

18 Claims, 1 Drawing Sheet

COMPUTER TELEPHONY INTEGRATION HOTELLING METHOD AND SYSTEM

Figure 1:
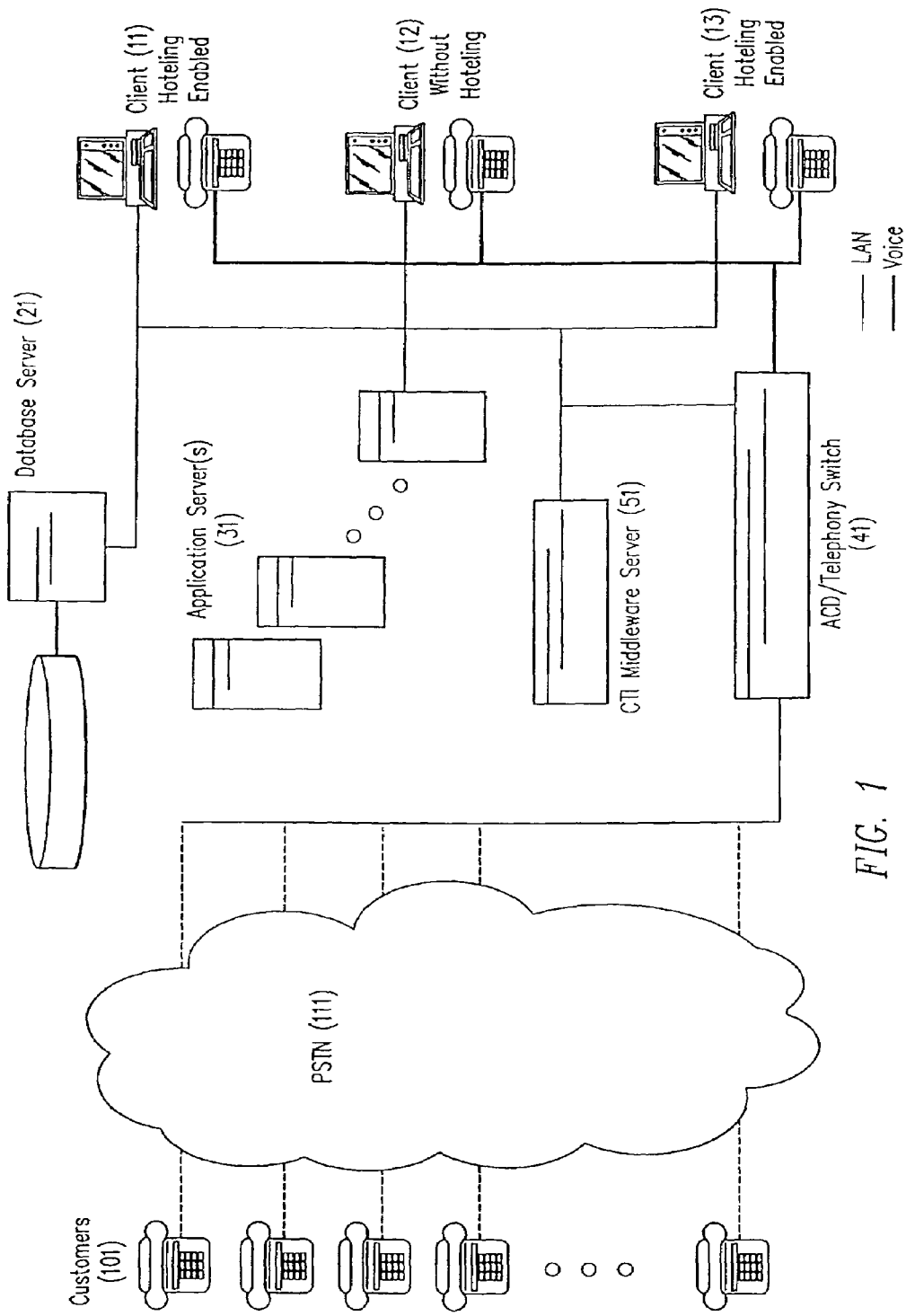

This application is a divisional of U.S. patent application Ser. No. 10/439,441, entitled "Computer Telephony Integration Hotelling Method and System," filed May 16, 2003, now U.S. Pat. No. 6,973,175 which is a continuation of U.S. patent application Ser. No. 09/541,379, filed Mar. 31, 2000, and which subsequently issued as U.S. Pat. No. 6,577,726. These applications are incorporated by reference herein, in their entirety and for all purposes.

FIELD OF THE INVENTION

The invention relates to network routing in a Computer-Telephony Integration (CTI) system where users, for example, users at multiple locations, are enabled to share and transfer a CTI session.

BACKGROUND

Companies are deploying mobile employees and multiple shifts of employees. Mobile employees usually have laptops and/or handheld devices as their workstations and may also have a dedicated desk at the office. However, there are occasions where these employees will be at another company location and will plug into the network, using an available teleset. Employees are given the freedom to move about within the facilities and chose a desk to work from. At each desk are a network connection and a teleset. Some desks may have workstations for use. Other companies are deploying multiple shifts of employee that use the same physical workstations and telesets as the other shifts. These employees are usually assigned a workspace for their shift or they may select any open workspace.

To enable these different types of deployments, a clear need exists for a CTI (computer telephony integration) system that can support non-secure CTI enabled telesets for all of the call center agents independently of physical location and that can also support CTI users to share enabled telesets and to transparently pass a caller or issue from one to another agent.

SUMMARY

The invention described herein relates to a system and method for CTI implemented "hotelling." Hotelling is the functionality of sharing CTI enabled telesets among multiple users. Users may be assigned to the telesets, or they may be sharing the same teleset, or the teleset may not be assigned to a particular person. Specifically, the invention provides a method and system where each agent or user has a unique login ID and password to access the CTI features from any known CTI enabled teleset. This enables a CTI user or agent to log in at any workstation in a network and utilize the system with the CTI enabled teleset, and also to transfer a CTI transaction or interaction to another CTI user or agent.

The method and system of the invention utilizes a computer telephony integration (CTI) system with a plurality of CTI-enabled telesets, each connected to an ACD or telephony switch which is connected to a CTI middleware server, and a plurality of workstations connected to the server. The system is configured so that each workstation and each teleset is identified to the server by a unique ID. This allows a user to log into the system with a user ID from any workstation and thereafter utilize computer telephony integration with a CTI enabled teleset. Additionally, a user can transfer a call, including the workstation screen information associated with the call, to another user at another workstation.

The CTI hotelling functionality also enables an agent to use any host (using their unique agent id) to login to the configuration. It also enables an administrator to use an administration tool to enable hotelling for a specific machine. If the machine is enabled for hotelling, the program will use the "hostname" to get the CTI configuration. If the machine is not enabled for hotelling, the program will use the agent default teleset to get the CTI configuration.

FIGURE

The invention is shown and illustrated by the FIGURE appended hereto.

FIG. 1 shows a hotelling enabled server with two two hotelling enabled clients, one non-enabled client, a database server, application servers, a CTI middleware server, an ACD/telephony switch, and customers connected through the public switched telephone network.

OVERVIEW

Hotelling is a powerful CTI tool that permits sharing of physical resources by multiple users. Users can log into the server from any enabled workstation and utilize the CTI system with the correct teleset. The teleset ID is determined by the machine name. Moreover, hotelling allows transferring calls to the right teleset by checking runtime information.

The capability that the method and system of the invention provides to a mobile user is illustrated by multiple examples. In one scenario, a call center agents works at a single call center, using a different computer, workspace and teleset each day. In a second scenario, a travelling consultant is moving to different locations, using different computers in each location. In still a third scenario, the Consultant is using the same computer (e.g. a laptop computer) and logging in from different locations on different days or times of day.

In all three scenarios, the employee has a teleset and extension assigned for inbound calls at his permanent office workspace. While at his desk the employee touches base with his contacts for one of the many projects that he is involved with.

Consultant achieves this by either (1) plugging his laptop into the corporate network, or (2) using the workstation and CTI teleset at the hotelling location, and logging on to his company's CTI enabled Server. He navigates to the "My Contacts" view of the "Contacts" screen. From this view, he drills down on the hyperlink of the Name of the project in which he is interested. This will bring the employee to the Contacts view and he right mouse-clicks on the person he would like to contact. The floating right mouse window is presented and employee selects Make Call from the window. The CTI method and system of the invention initiates the call to the contact for the employee. The employee picks up his telephone handset or talks in his hands-free headset when the phone is answered by his contact. During his conversation, employee has navigated to areas of interest within the hotelling enabled application, and especially a CTI customer relationship management application. The conversation reaches a point where employee needs to conference in another employee, so he selects the Conference Transfer button on the CTI Toolbar and is presented with a Begin Conference pop-up box. Employee types in the name of the person he wants to conference, performs the search and selects the Call button to initiate the conference call. The CTI method and system initiates the conference call by placing the current call on hold, dialing the number, and forwards Employee existing view to the fellow consultant to be conferenced. The view is forwarded so that the person joining the conference has the appropriate information to participate in the call. When the person joining the call accepts the call from the CTI Toolbar, the voice connection between the parties is established, and the view from Employee is presented to the recipient.

After making a round of calls from his desk with his CTI enabled application, Employee heads to another location for a meeting and to continue making his calls. He arrives at the other location and finds an empty workspace with a connection to the corporate network and a phone that has been CTI enabled for the method and system of the invention. Again Employee plugs his laptop into the corporate network or uses a workstation already installed, and logs on to his hotelling enabled application and the company's CTI Server and continues, as if he was at his permanent desk, to make calls to his contacts with CTI. In these two scenarios, Employee goes to a different location and (1) uses the same computer, but logs in from a different location, and (2) uses a different computer.

While Employee is in the office, he is able to accept inbound calls from his workspace with the CTI toolbar, menu items, or shortcuts. This is true whether he is at his permanent desk or at a desk with a CTI enabled teleset in another office.

The method and system of the invention is also useful to roaming CTI users. Consider a Corporation, that has sales offices throughout the world. Many of their sales staff visit their sales offices as needed. Therefore they do not have assigned workspaces at their sales offices. Each workspace in the sales office is equipped with a PC workstation and a CTI enabled teleset. The sales team members do not have dedicated telesets and extensions for inbound calls but are dependent on the workspace they are using at a specific time. The sales team members are assigned an extension. Calls to sales team members are usually directed to their voicemail boxes, unless they are in the office and logged into the server, in which case, calls are directed to the appropriate CTI enabled teleset.

When members of the sales team visit their sales office, they would select a vacant workspace. The sales team members are not tied to a specific workspace and are free to select and use any available workspace in the office.

Consider a sales team member who comes into the office to make follow up calls to contacts associated with his accounts. He logs on, with his own unique ID and password, to the company's CTI enabled server, navigates to the Accounts, screen and clicks on the hyperlink of the account of interest. He then selects contacts from the Account Contact view that he wants to follow up with. Once the individual is selected, he clicks the right mouse button on the contact and selects the Make Call option from the pop up menu. The CTI Server dials the contact and the sales team member picks up the telephone handset when the phone is ringing.

While the sales team member is in the office, he is able to accept inbound calls from his workspace with the CTI toolbar, menu items, and/or shortcuts.

Shared telesets and workstations among CTI users is another aspect of the invention. Consider a Corporation that provides a 24/7 customer contact center to service their customers. The days are partitioned into three eight-hour shifts of three hundred agents per shift. At each of the three hundred workspaces is a PC workstation and a CTI enabled teleset. For each shift, agents are assigned to specific workspaces. Thus, three different agents throughout a 24-hour period share each workspace. These three agents also share the same permanent telesets for inbound non-ACD calls.

Agents log in to the server with their own unique ID and password at their assigned workspace. The agents automatically log into their ACD queues at start up and perform telephony controls from the CTI toolbar, the CTI Menu, and the right mouse menus. Current views are also transferred when calls are transferred to another CTI user.

While the agents are at their workspace, they may accept inbound calls on their non-ACD line with the CTI toolbar, menu items, and shortcuts.

It is seen that the method and system of the invention provide the user with a high degree of CTI connectivity and a high degree of CTI flexibility.

The following defined terms are used in this document.

Automated Call Distributor (ACD)—An Automated Call Distributor may be a component of a telephony switch or it may be an external server. ACDs are features that route an inbound call from the telephony switch's point of view. Agents, groups/queues and routing steps are defined within the ACD for call routing purposes. This is usually confined to one telephony switch. Whereas, CTI can enable the routing of calls and data to multiple switches.

Call Center Agents—Users of the system who receive and make calls, and track responses/opportunities pertaining to campaigns.

Computer Telephony Integration (CTI)—Integration of telephony networks and data networks to allow integrated and seamless telephony control from a desktop application.

Hotelling—The functionality of sharing CTI enabled telesets among multiple users. Users may be assigned to the telesets, or they may be sharing the same teleset, or the teleset may not be assigned to a particular person.

Teleset—An augmented telephone with CTI buttons and features, connected to and integrated with a CTI enabled server through an ACD (or switch) for use in call centers.

The interconnections and architecture of these various elements is illustrated in FIG. 1. FIG. 1 shows a hotelling enabled client-server system with a database server, 21, serving three clients, 11, 12, and 13. Each client has a teleset and a workstation. Two of the clients, 11, and 13, are hotelling enabled, and one client, 12, is not hotelling enabled. The client workstations are connected to the database server, 21, the application servers, 31, and the CTI middleware server, 51, through a LAN. The telesets are connected to the CTI middleware server, 51, through an ACD/Telephony Switch, 41, to the CTI middleware server, 51. The customers, 101, are connected to the system through a Public Switched Telephone Network (PSTN), 111, and the ACD/Telephony Switch, 41.

DETAILED DESCRIPTION

Hotelling is a powerful CTI tool that permits sharing of physical resources by multiple users. Users can log into the server from any enabled workstation and utilize the CTI system with the correct teleset. The teleset ID is determined by the machine name. Moreover, hotelling allows transferring calls to the right teleset by checking runtime information. The CTI method and system of the invention provides computer telephony integration to support a broad variety of Automated Call Distributors (ACD) and telephony switches to allow rapid deployments of call center technology.

FIG. 1 shows a hotelling enabled CTI system with a hotelling enabled CTI server 21, three CTI terminals, 11, 12, 13, and CTI and hotelling enabled telesets.

Hotelling

The CTI method and system of the invention supports hotelling and multi-shift call center deployments by providing the ability for employees to share workspaces while providing universal access to the server application with the associated teleset enabled via CTI. As a result, call centers can successfully implement 24×7 inbound and outbound call center operations while leveraging shared hardware technology and resources. In addition, the CTI method and system of the invention allows call centers to implement flexible staffing strategies by allowing agents to rotate workspaces based on work schedules and workspace availability.

CTI hotelling features include support for multiple users to share the same CTI enabled teleset, support for any agent to use a single login to access Siebel CTI from any hotel-enabled teleset, and reduced CTI administration by not requiring association of every employee for hotelling enabled telesets.

If a workstation is hotelling enabled, the application will use the hostname to find the teleset, and the configuration.

In the prior CTI architectures, there is no link between teleset and hostname. However, in the method and system of the present invention a HOST field is created the in All Teleset applet or database fields, to create the link between the teleset and the hostname.

When the CTI enabled application starts up, it checks that the agent is a valid CTI agent, that is, a valid entry in the appropriate field of the All Teleset applet or database. If there is not a valid CTI agent in this field, CTI will normally be disabled. If there is the valid agent, the application will use the local hostname to find the teleset from a system configuration table, such as a S_CTI_TELESET table. However, when data is found, hotelling is enabled for this workstation, and the application will use this teleset data to find the configuration.

Since the hotelling feature creates runtime data, a user does not have a static link with any specific teleset. Therefore the CTI method and system of the invention creates the mapping between hostname and agent for providing dynamic information. The system stores the hostname to a database table, as the S_CTI_USER table in Siebel. When the application starts up successfully, it stores the hostname to S_CTI_USER table by username. When the application is shutting down, it removes the hostname from the database.

When an administrator enables the hotelling feature for a machine, the administrator specifies the hostname for a teleset in the All Telesets applet in the All Telesets view. The Administrator can also use Agents View to monitor/modify the agent-host runtime relationship.

Algorithms and procedures

The following pseudo code describes procedures on the driver manager.

Startup. During startup the system checks for a valid user while marking a hotelling flag "false." If no valid user is found, the system updates the hostname field for tracking and hostname. If a valid user is found, the hotelling flag is set to "true" and hotelling is enabled. The following pseudo code is illustrative:

Check that employee is a valid CTI user.
Mark the hotelling flag to be false.
Use hostname to check the S_CTI_TELESET table to find valid hotelling teleset.
If found, this machine supports hotelling and is open to every agent. Set hotelling flag to "true". Update the hostname field in S_CTI_USER for tracking agent/hostname.
If not found, update the hostname field in S_CTI_USER. Use the default teleset for the valid CTI user.

Shutdown:
Remove hostname from S_CTI_USER table.
When calling or transferring to an employee using a hotelling enabled teleset, the system searches for the hostname in the S_CTI_USER table, database, or applet, by user name. If an entry is not found, the work phone number is used. If found, this extension is used with the hostname in the application.
Find the hostname from S_CTI_USER table by user name.
If not found, use work phone in Employee.
If found, get the extension by hostname.

While the invention has been described with respect to certain preferred embodiments and exemplifies, it is not intended to limit the scope of the invention thereby, but solely by the claims appended hereto.

We claim:

1. A method comprising:
dynamically associating a workstation with a teleset such that data related to a call on the teleset are transferred to the workstation;
the dynamically associating the workstation with the teleset comprises:
determining a hostname for the workstation;
searching for the hostname in configuration data; and
if the hostname is found, identifying the teleset from an association between the teleset and the hostname.

2. The method of claim 1 wherein the dynamically associating the workstation with the teleset is performed automatically.

3. The method of claim 1 wherein the dynamically associating the workstation with the teleset is performed without input from a user.

4. The method of claim 1 further comprising:
causing the call to be transferred to a second teleset;
dynamically associating a second workstation with the second teleset such that the data related to the call are transferred to the second workstation.

5. The method of claim 1 further comprising transferring the data related to the call to the workstation, and displaying the transferred data to a user of the workstation.

6. The method of claim 1 wherein the dynamically associating the workstation with the teleset comprises:
notifying a server that associated data for each call on the teleset are to be transferred to the workstation, wherein the server transfers the associated data to the workstation.

7. The method of claim 1 wherein
the dynamically associating the workstation with the teleset comprises checking runtime data to determine an association between the workstation and the teleset.

8. The method of claim 7 further comprising:
forming a second association between a user of the workstation and the workstation runtime.

9. A system comprising:
associating means for dynamically associating a workstation with a teleset; and
notifying means for notifying a server to transfer data related to a call on the teleset to the workstation;

determining means for determining a hostname for the workstation;

searching means for searching for the hostname in configuration data; and identifying means for identifying the teleset from an association between the teleset and the hostname.

10. The system of claim 9 further comprising:

displaying instructions to display the data at the workstation during the call.

11. The system of claim 9 further comprising:

transferring means for transferring the call to a second teleset;

second associating means for dynamically associating a second workstation with the second teleset; and second transferring means for transferring the data to the second workstation.

12. The system of claim 9 further comprising:

checking means for checking runtime data to determine an associate between the workstation and the teleset.

13. The system of claim 12 further comprising:

forming means for dynamically forming a second association between a user of the workstation and the workstation at runtime.

14. A computer-readable medium storing executable instructions the executable instructions comprising:

associating instructions to dynamically associate a workstation with a teleset; and notifying instructions to notify a server to transfer data related to a call on the teleset to the workstation;

determining instructions to determine a hostname for the workstation;

searching instructions to search for the hostname in configuration data; and identifying instructions to identify the teleset from an association between the teleset and the hostname.

15. The computer-readable medium of claim 14 further comprising:

displaying instructions to display the data at the workstation during the call.

16. The computer-readable medium of claim 14 further comprising:

first transferring instructions to transfer the call to a second teleset;

second associating instructions to dynamically associate a second workstation with the second teleset; and second transferring instructions to transfer the data to the second workstation.

17. The computer-readable medium of claim 14 further comprising:

checking instructions to check runtime data to determine an association between the workstation and the teleset.

18. The computer-readable medium of claim 17 further comprising:

forming instructions to form a second association between a user of the workstation and the workstation.

* * * * *